Figure 1:
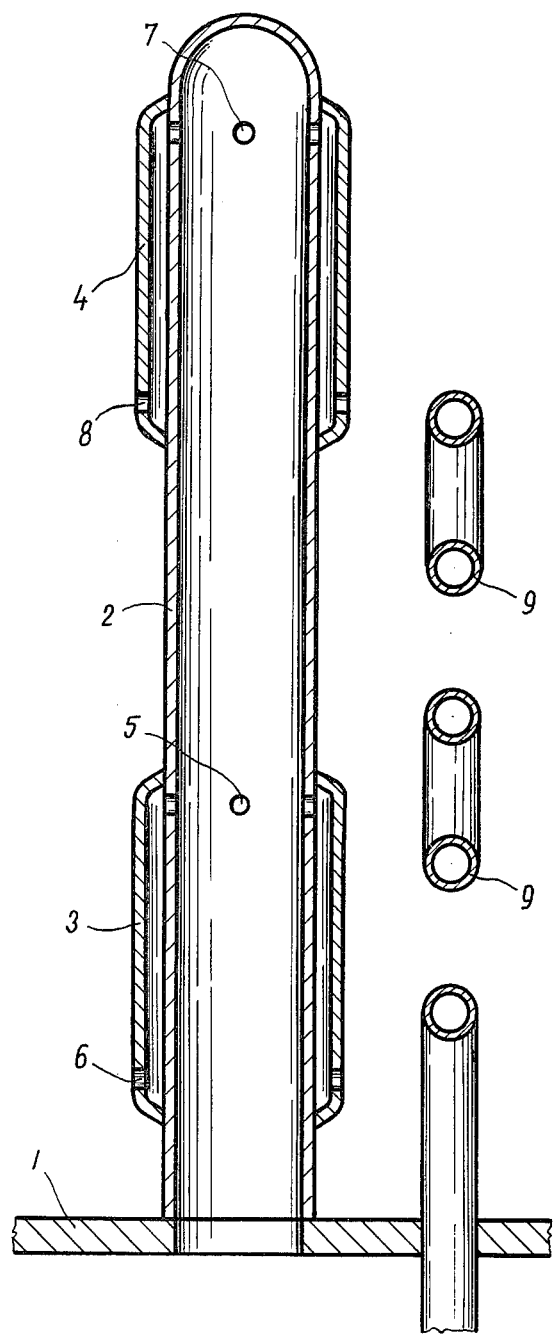

United States Patent [19]

Beranek et al.

[11] 4,263,723
[45] Apr. 28, 1981

[54] CAP FOR INLET OF FLUID INTO THE FLUIDIZED BED

[75] Inventors: Jaroslav Beránek, Prague; Milan Bechyné, Lány; Dobromil Pihert, Kladno, all of Czechoslovakia

[73] Assignee: Ceskoslovenska akademie ved, Prague, Czechoslovakia

[21] Appl. No.: 55,490

[22] Filed: Jul. 6, 1979

[30] Foreign Application Priority Data

Jul. 7, 1978 [CS] Czechoslovakia .................... 4525-78

[51] Int. Cl.³ .............................................. F26B 3/08
[52] U.S. Cl. .................................. 34/57 B; 34/57 R; 239/558; 422/141; 422/143; 432/58
[58] Field of Search ................... 34/57 R, 57 A, 57 B; 423/659, DIG. 16; 432/15, 58; 422/139, 141, 143; 110/245; 239/558

[56] References Cited

U.S. PATENT DOCUMENTS

| | | |
|---|---|---|
| 3,298,793 | 1/1967 | Mallison et al. ...................... 34/57 A |
| 3,552,033 | 1/1971 | Steever et al. ....................... 34/57 A |
| 3,708,887 | 1/1973 | Erisman ................................ 34/57 A |
| 3,897,546 | 7/1975 | Beranek et al. ................... 423/659 F |
| 3,914,089 | 10/1975 | Desty et al. .......................... 34/57 A |

FOREIGN PATENT DOCUMENTS

PV4523-78 7/1978 Czechoslovakia .

*Primary Examiner*—Larry I. Schwartz
*Attorney, Agent, or Firm*—Burgess, Ryan and Wayne

[57] ABSTRACT

The invention concerns the design arrangement of the cap for the inlet of fluid into the fluidization bed which is heated or cooled by the methods described in U.S. Pat. Nos. 3,897,546 and 3,908,284. The cap is formed by an inlet pipe closed at its upper end on which are formed two or more mutually separated chambers, while in this pipe a number of holes is drilled for the inlet of fluid into the chambers. Into these chambers a number of holes are drilled for the outlet of fluid from these chambers into the fluidized-bed. The vertical distance of the inlet holes from two neighboring chambers of the cap either equals or is smaller than one and one-half times the height of the heat exchanger situated in the particular fluidization bed formed between these two neighboring chambers of the same cap. The caps were used for the inlet of the combustion air into a fluidized-bed combustor, while the pressure drop of the lower part of the cap did not exceed 10% of the pressure drop of the upper part of the caps.

3 Claims, 2 Drawing Figures

CAP FOR INLET OF FLUID INTO THE FLUIDIZED BED

This invention relates to an arrangement of the cap for the introduction of fluid into a fluidized-bed which is heated or cooled by methods described in U.S. Pat. Nos. 3,897,546 and 3,908,284 and by the fluid inlet into the fluidized-bed described in Czechoslovak application PV-4523-78.

The method of introduction of fluid into the fluidized-bed according to Czechoslovak application PV4523-78 is based on distribution of the fluid into the fluidized-bed by a system of inlets so that from each inlet the fluid streams simultaneously at two or more heights into the fluidized-bed. The flow rate of fluid introduced through the highest part of the inlets corresponds to the minimum of fluidization velocity.

The method of cooling or heating of the fluidized-bed described in U.S. Pat. Nos. 3,897,546 and 3,908,284, which are embodied herein in their entirety by reference, is based on a division of the fluidized-bed into particular fluidization beds with varying intensity of axial mixing of particles so that the fluidization fluid is introduced at two or more heights into the fluidized bed. By positioning the heat exchanger into some of the particular beds it is then possible to vary the heating or cooling intensity of particular beds by changing the ratio of the fluidization fluid introduced into neighboring, particular beds. This proposed method of cooling of the fluidized-bed has been applied in control of thermal output of the fluidized-bed combustor. The combustion air was introduced into the fluidized-bed through two independent systems of caps. Air was introduced through the first system of caps (lower caps) just above the bottom of the fluidized-bed combustor. Air was then introduced through the second system of caps (upper caps) into the fluidized-bed at a height 0.5 m above the lower caps. Then the combustion air was introduced into two separate distribution chambers situated one above the other. The inlet pipes then led from these chambers into individual caps. The pipes of the cooling system were submerged in the fluidization bed between the upper and lower caps. The rate of heat transfer for the fluidization bed into the cooling system was varied by exchange of the flow rate of the air introduced into the bed through the lower and upper caps. This enabled control of the temperature of the fluidized-bed.

The disadvantage of the described air inlet into the fluidized-bed combustor is that for uniform distribution of air over the cross-sectional area of the fluidization bed twice as many caps had to be used as compared with the bottom cap plate through which the fluid is introduced into the fluidized-bed at a single height above the bottom of the combustor.

The given disadvantages are corrected by the cap for inlet of fluid into a fluidized-bed according to the present invention whose principle is based on two or more naturally separated chambers formed in the inlet pipes while the inlet pipe has a number of holes for the inlet of fluid into these chambers and these chambers have a number of holes for the outlet of fluid into the fluidized-bed. The distance of outlet holes from two outlet chambers of caps is equal to or smaller than one and one-half times the height of the heat exchanger, situated into the particular fluidized-bed formed between these two neighboring chambers of the same cap.

The advantage of the inventive cap is especially in the simplified design of the bottom of the fluidization reactor so that the number of caps and distributing chambers is reduced in direct proportion to the number of pipes along the vessel height through which the fluid is introduced into the fluidized-bed. Another advantage of this cap is in practical independence of its pressure drop on the flow rate of fluid through this cap. This is due to variations in pressure drop of the lower part of the cap which is small in comparison to the total pressure drop of the fluidized-bed and of the distributing bottom cap plate.

Figure 2:
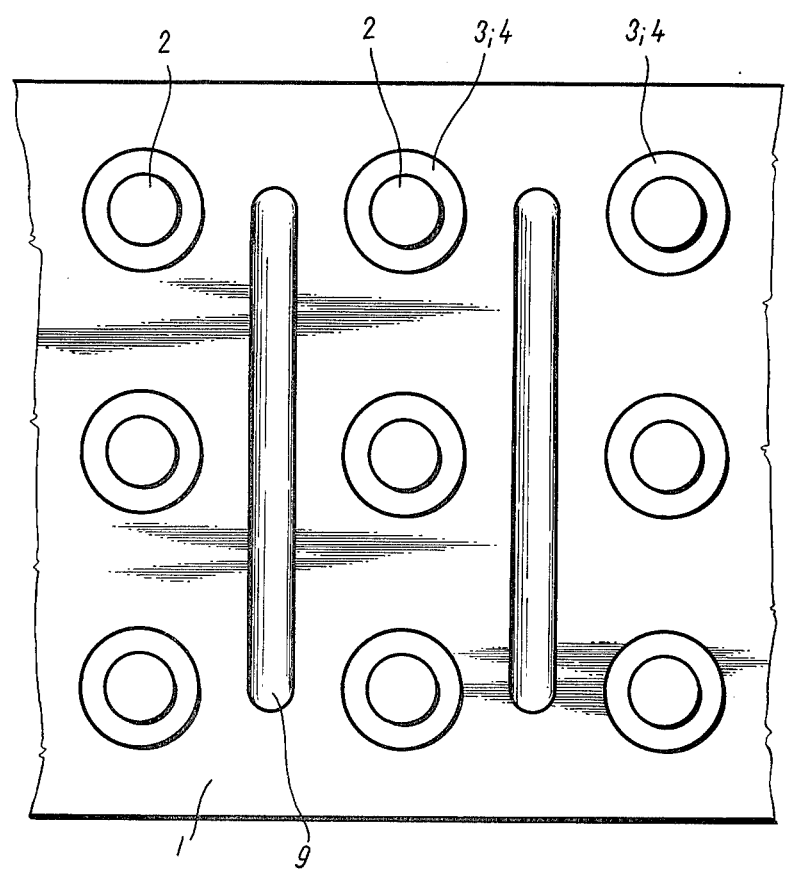

FIG. 1 is a vertical cross-sectional view of the cap according to the invention showing a fluid inlet into the fluidized-bed at two heights; and FIG. 2 is a plan view of the cap distributor.

The cap for the fluid inlet into the fluidized-bed is formed by a vertical pipe 2 which is closed at the upper end and has a lower chamber 3 and an upper chamber 4 which are mounted on both ends of the pipe 2. In the pipe 2 are drilled holes 5 and 7 for the inlet of fluid into chambers 3 and 4. The lower chamber 3 has a number of holes 6 and the upper chamber 4 has a number of holes 8 for the outlet of fluid from the chambers 3 and 4 into the fluidized bed. In the space between the outlet holes 6 and 8 are situated heat exchangers 9 for heating and cooling of the fluidization fluid. The vertical distance of the inlet holes from two neighboring chambers of the cap either equals or is smaller than one and one-half times the height of the heat exchanger situated in the particular fluidization bed formed between these two neighboring chambers of the same cap.

The hydraulic pressure drop of the upper part of the inlet cap between holes 5 in pipe 2 and the fluidized bed surrounding holes 8 is equal to the static pressure drop in the fluidized bed in a height corresponding to the vertical distance between holes 6 and 8 if the flow rate through the upper part of the inlet cap, calculated on the horizontal cross section of the fluidized bed, corresponds to from one-half to two times the minimum fluidization velocity. The size, number and shape of holes 5 and 7 in the inlet pipe 2 as well as the size, number and shape of holes 6 and 8 in chambers 3 and 4 is chosen so that the pressure drop of the bottom part of the cap at the smallest required fluid flow rate does not exceed 10% of the pressure drop of the upper part of the cap.

One example of the application of the cap for the fluid inlet into a fluidized-bed according to this invention which is illustrative and not limiting, is for the inlet of combustion air into a fluidized-bed combustor like that of U.S. Pat. No. 3,897,546 and is demonstrated in FIG. 2. The square shaped reactor bottom 1 was used, with caps arranged in parallel lines with an equal distance between caps in both directions. The holes 6 and 8 in the jackets of chambers 3 and 4 were rectangular and their distance was 0.5 m. The pressure drop of the upper part of the chamber at the smallest air flow rate 0.3 m sec$^{-1}$ was 4250 Pa (Pascals) related to 1 m$^2$ of horizontal cross-section of equipment in the fluidized-bed. The total pressure drop of all caps inclusive in the fluidized-bed was 9050 Pa.

At an increase of the air flow rate of 0.9 m/sec, the pressure drop of one cap increased to 6050 Pa and the total pressure drop of the cap bottom with the fluidized-bed increased to 10,850 Pa.

We claim:

1. A cap for the inlet of fluid into a fluidized-bed, which is separated into two sub-beds superimposed one on the other, each having different physical longitudinal particle mixes than the other and into which are submerged heat exchangers for heating or cooling said fluidizing bed, comprising an inlet pipe closed at the upper end and carrying and annular chamber near each end, said annular chambers being positioned in the upper and lower sub-beds respectively, a plurality of holes formed on the inlet pipe for the inlet of fluid into the chambers and a plurality of holes in said chambers for the outlet of fluid from said chambers into the fluidized bed.

2. A cap for the inlet of fluid into a fluidized-bed according to claim 1, wherein the vertical distance between said outlet holes from the neighboring chambers of the cap is between one and one and one-half times the length of the heat exchanger situated in the particular fluidized-bed and lying between these two neighboring chambers of the same cap.

3. A cap for the inlet of fluid into a fluidized-bed according to claim 1, wherein the size, number, and shape of said inlet holes and said outlet holes is such that the pressure drop at the bottom part of the cap at the smallest required fluid flow rate does not exceed 10% of the pressure drop of the upper part of the cap.

* * * * *